United States Patent [19]

Coss

[11] Patent Number: 5,108,241
[45] Date of Patent: Apr. 28, 1992

[54] CHIP BREAKER DRILL BUSHING

[75] Inventor: David A. Coss, Puyallup, Wash.

[73] Assignee: The Boeing Company, Seattle, Wash.

[21] Appl. No.: 683,388

[22] Filed: Apr. 10, 1991

[51] Int. Cl.$^5$ .............................................. B23B 47/34
[52] U.S. Cl. ................................ 408/72 B; 408/115 B; 408/241 B
[58] Field of Search ............... 407/2, 6; 408/72 B, 408/115 B, 241 B, 72 R

[56] References Cited

U.S. PATENT DOCUMENTS

| | | | |
|---|---|---|---|
| 1,612,205 | 12/1926 | Muth | 408/67 X |
| 2,375,367 | 5/1945 | Johnson | 408/241 B X |
| 3,874,808 | 4/1975 | Zaccardelli et al. | 408/72 B X |
| 3,514,120 | 4/1985 | Hougen | 408/72 B X |

FOREIGN PATENT DOCUMENTS 2575095  6/1986  France ....................... 408/241 B

*Primary Examiner*—Steven C. Bishop
*Attorney, Agent, or Firm*—Elizabeth F. Harasek; Bernard A. Donahue

[57] ABSTRACT

A chip breaker drill bushing is provided for a metal drilling apparatus. The bushing has a central channel through which a drill bit or drilling tool extends and rotates. The bushing is shaped at the workpiece end to collect metal offal carried up by the drill. Angled troughs guide the offal up and away from the workpiece and cutting edges on the end of the bushing chop the strands into small, easily handled chips.

4 Claims, 1 Drawing Sheet

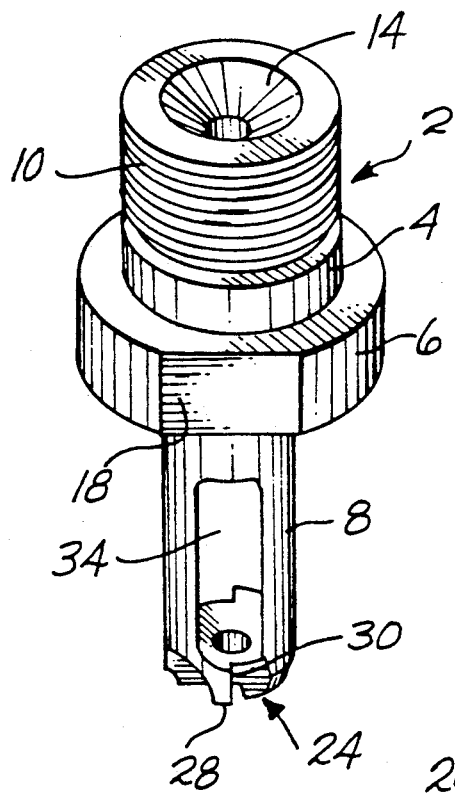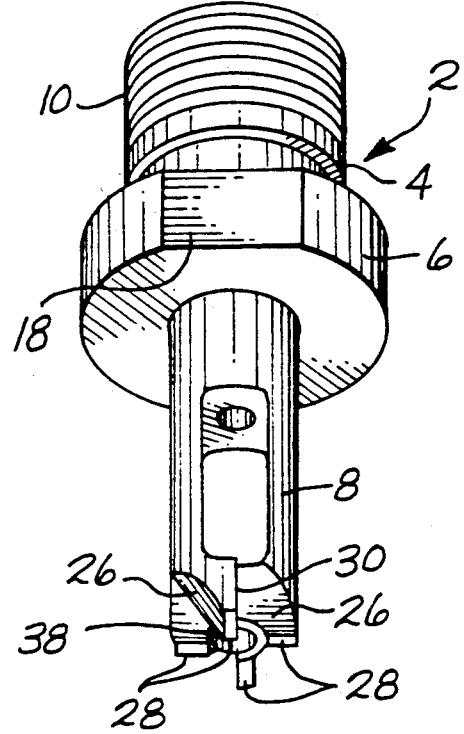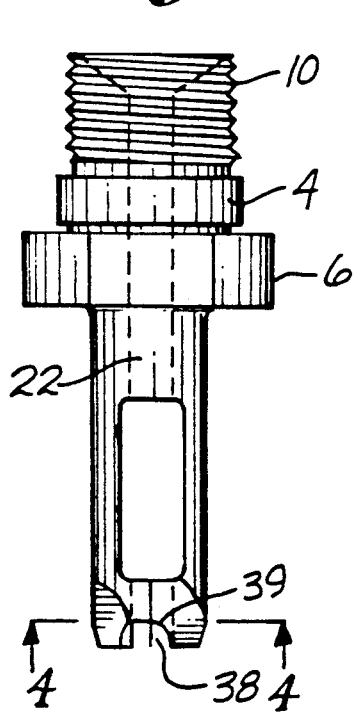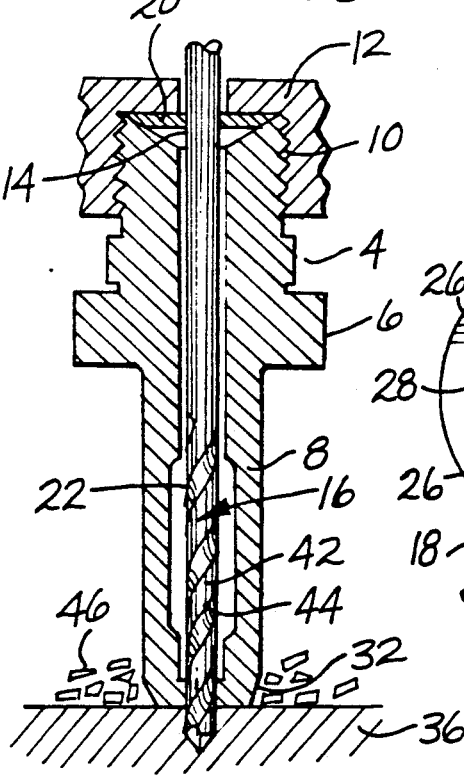

CHIP BREAKER DRILL BUSHING

This invention relates to a novel bushing for power drills which breaks long metal strings created by the drilling process into more manageable pieces.

BACKGROUND

The fabrication of aircraft requires drilling many holes into thick aluminum sections. There is a tendency for the long metal strands created by drilling to travel up the drill flutes and become wedged between the tool and its holder. This can jam the drill or break it. The long, curly metal shavings are also sharp and difficult to vacuum.

Prior attempts to solve this problem involved redesigning drill bits to break the strands into smaller pieces However, no acceptable solution was found, the best results being the production of finer, but still unwieldy, long, curly scrap.

BRIEF SUMMARY

In accordance with a preferred embodiment, a specially adapted chip breaker bushing is mounted to a drill. The bushing has a central hole through which the drill bit or drilling tool extends and in which it is free to rotate. The bushing is shaped at the end which contacts the work surface to collect the metal strands carried up by the drill. Angled troughs catch and guide the strands up and away from the workpiece and cutting or breaking edges on the end of the bushing chop the strands into small, easily handled chips.

My invention will be better understood in terms of the following detailed description.

DETAILED DESCRIPTION

FIG. 1 is a forward tilted perspective view of a chip breaking drill bushing for a drilling tool in accordance with the invention.

FIG. 2 is a backward tilted perspective view of the chip breaking bushing of FIG. 1.

FIG. 3 is a front view of a subject bushing, partly in section.

FIG. 4 is an end view of the bushing of FIG. 3 taken along line 4—4.

FIG. 5 is a sectional front view of a subject bushing showing it threaded into a drill body with a drill piercing a workpiece.

Referring to FIGS. 1 to 5, a chip breaking bushing 2 is shown. It was designed specifically for the tool arm of a manufacturing robot, but its design could be readily adapted by one skilled in the art to fit any apparatus for drilling metal. Bushing 2 comprises neck 4, collar 6 and guide shaft 8. Threads 10 on neck 4 screw into holder 12. Chamfer 14 seats into a complementary template 20 to align bushing 2 to drill bit 16. Collar 6 has indented tool grips 18. A drill channel 22 is located in the center of bushing 2.

Key to the invention is the shape of nose 24 of guide shaft 8. In the preferred embodiment shown in the figures, nose 24 has four troughs slanted helically, radially outward, and axially reward 26 separated by four cutting teeth 28. The intersection of the slanted troughs 26 and the drill channel 22 form a cutting edge 39. A trough and cutting edge 39 26 forms the left hand side of a tooth 28 as bushing 2 is viewed in drilling position for a drill rotating clockwise. Right hand side 30 of a tooth 28 is substantially vertically oriented with respect to drill 16. Beveled edge 32 helps prevent offal from being trapped between bushing 2 and a workpiece 36. An open notch 38 is formed at junction 30 of each two teeth 28 between bushing 2 and workpiece 36. Optionally, a window 34 may be provided in guide shaft 8.

Operation of bushing 2 will be better understood in view of FIG. 5. FIG. 5 shows drill bit 16 piercing workpiece 36. Drill 16 has helically arranged flutes 42 adjacent outer margins or lands 44. Metal strands, created by drilling, travel out of workpiece 36 in flutes 42. Shape of nose 24 of bushing 2 causes these strands to pass upward through notches 38 and come into cutting or breaking contact with teeth 28. Long strands are thereby reduced to smaller, more manageable pieces 46.

EXAMPLE

A chip breaker drill bushing like that described in the several drawings was machined from a conventional tool steel drill bushing used on a robotic end affector for drilling holes in metal. It was about 3½ inches high. The nose was about ¾ inch in diameter, and had four equally spaced teeth radiating off-center essentially as shown in FIG. 4. The channel through the drill bushing was slightly larger than the drill it accommodated, in this case, a ¼ inch diameter bit. The troughs were cut in at a canted angle of 30 degrees with respect to the vertical and the right hand sides of the teeth were vertically oriented. A slight bevel of about 10 degrees was machined around the nose.

The bushing, which remains stationary adjacent the workpiece, effectively cut or broke strands of steel and aluminum into small chips at drilling speeds of about 500 and 1500 rpm, respectively.

While my invention has been described in terms of a preferred embodiment thereof, other forms may be readily adapted by one skilled in the art. For example, the number of teeth on the nose of a chip breaker bushing can be changed to accommodate the number of flutes, on a drill. It is desirable to have at least as many cutting or breaking teeth on the bushing as flutes on the drill.

Similarly, the angle and cant of the troughs and the size of the notches may be varied to best accommodate drill design and drilling speeds. The window in the guide shaft is optional, and it may be better to eliminate it if deeper teeth are wanted. The chip breaker bushing may be used in conjunction with portable drills, drill presses, milling machines, or other drilling tools.

Accordingly, the scope of my invention is to be limited only in accordance with the following claims.

I claim:

1. A bushing 2 for a drilling apparatus comprising a guide shaft 8 having a drill channel 22 there through and a plurality of cutting or breaking teeth 28 in the nose 24 of said shaft 8, each said tooth having a slanted trough side 26, a cutting edge 39, a substantially vertical side 30, and an open notch 38 at the junction of each said trough side 26 and vertical side 30, such that long strands of metal created by drilling are cut or broken into smaller pieces by said teeth 28.

2. A bushing 2 for a drilling apparatus comprising a guide shaft 8 having a drill channel 22 there through, a drill having a plurality of flutes located in said channel 22, at least as many cutting teeth 28 as said flutes in the nose 24 of said shaft 8, each said tooth having a slanted trough side 26, a cutting edge, a substantially vertical side 30, and an open notch 38 at the junction of each said trough side 26 and substantially vertical side 30, such that long strands of metal created by drilling are cut between said bushing and workpiece into smaller pieces by said teeth 28.

3. The bushing of claim 1 having four said cutting or breaking teeth.

4. The bushing of claim 1 further characterized by a beveled edge 32 on said nose 24.

* * * * *